United States Patent [19]
McCoy et al.

[11] Patent Number: 5,492,216
[45] Date of Patent: Feb. 20, 1996

[54] METHOD AND APPARATUS FOR TRANSFERRING CONTAINERS WHILE MAINTAINING VERTICAL ORIENTATION

[75] Inventors: Byron A. McCoy; Thomas G. Howell, both of Lynchburg, Va.

[73] Assignee: Simplimatic Engineering Company, Lynchburg, Va.

[21] Appl. No.: 208,436

[22] Filed: Mar. 9, 1994

[51] Int. Cl.[6] .................................................. B65G 15/14
[52] U.S. Cl. ........................................ 198/626.5; 198/833
[58] Field of Search ................................. 198/626.1, 833, 198/816, 626.5, 837

[56] References Cited

U.S. PATENT DOCUMENTS

| | | |
|---|---|---|
| 2,868,356 | 1/1959 | Haaff . |
| 3,179,237 | 4/1965 | Ninneman ........................ 198/626.5 X |
| 3,738,260 | 6/1973 | Navi et al. ....................... 198/626.5 X |
| 3,858,473 | 1/1975 | Bystron . |
| 3,869,574 | 3/1975 | Kume ................................. 198/837 X |
| 3,915,291 | 10/1975 | Vogts . |
| 3,967,720 | 7/1976 | Arieh . |
| 4,034,904 | 7/1977 | Juditzki . |
| 4,161,138 | 7/1979 | Marchetti ......................... 198/626.5 X |
| 4,863,010 | 9/1989 | Proksa et al. . |
| 4,934,510 | 6/1990 | Lutgendorf ...................... 198/626.1 X |
| 5,094,340 | 3/1992 | Avakov . |
| 5,261,527 | 11/1993 | Krismanth et al. ................. 198/527 X |

FOREIGN PATENT DOCUMENTS 1206268  2/1960  France ............................. 198/626.5

*Primary Examiner*—D. Glenn Dayoan
*Attorney, Agent, or Firm*—St. Onge Steward Johnston & Reens

[57] ABSTRACT

A method and apparatus enable horizontally transporting a succession of objects, such as glass bottles, without bottom support and yet maintaining precise, consistent centerline location. A pair of continuous transport belts are supported, preferably by a pair of complimentary interlocking belts, to maintain a substantially constant distance between the facing object-supporting surfaces. Preferably, the interlocking belts are made of alternating teeth and grooves transverse to the horizontal transfer path. The belts are rendered substantially inextensible transverse to the direction of the path.

18 Claims, 4 Drawing Sheets

METHOD AND APPARATUS FOR TRANSFERRING CONTAINERS WHILE MAINTAINING VERTICAL ORIENTATION

TECHNICAL FIELD

The invention relates to conveyor systems that can support vertically-oriented objects, including containers such as glass bottles or jars, with greater precision and transport them horizontally with their bottoms free.

Inspection for defects is an essential part of any manufacturing process. Some modern container manufacturing plants are set up to continuously transport containers from a molding station to a final packaging station. While inspection should also take place continuously, it is currently difficult to inspect the bottoms of containers or other molded objects because this requires removing their bottom support.

There has been an inability to maintain vertical alignment with consistent repetitive location of objects about the centerlines of the objects, while supporting objects for inspection, for example by computerized cameras, and moving capable of maintaining a uniform vertical orientation during high-speed horizontal movement without bottom support.

BACKGROUND ART

The prior art has developed a wide variety of conveyors, some of which are useful for moving containers past an inspection station. However, none are available that can hold a bottle or other container vertically, horizontally transport it in a uniform vertical orientation with location repeatability, and provide free access to its bottom.

In one known system, illustrated in FIGS. 4 and 5 which depict this prior art, a pair of opposed belts 1 and 2 grip bottles 3 between tubular rubber cushions 4. Each of the rubber cushions is mounted on a plastic slide 5. The slides 5 are affixed to a chain drive 6. A flared base 7 on each of the slides guides the slide and the belt in which it is comprised around a rigid support track 8. The track 8 control the spacing of the belts. This type of transport suffers from two major problems: first, friction between the slides 5 and the track 8 causes wear and binding; and secondly, when the friction has caused wear, the belts can no longer hold the objects firmly enough to achieve consistent location, and vertical misalignment of the objects results from unpredictable alignment between the objects (shown as bottles 3) and the cushions 4. The alignment problem is illustrated.

When we attempted to correct the alignment problems by employing a flat belt which was guided over a smooth backing support, the belt rapidly began to wear and showed signs of failure. The use of rollers, instead of a smooth backing, to support the belt would not be an acceptable solution because the rollers would create high points in the belt. Those high points would cause vertical misalignment of the containers—either rotation from front to back or skewing from side to side with respect to the desired vertical axis.

There is a need for a method and apparatus capable of transporting a glass bottle or other container horizontally, while leaving the bottom free and maintaining a uniform vertical position. It is important to obtain consistent location relative to the centerline of an object. Precise centerline location is especially important when using optical cameras which, with computerized defect detection apparatus, compare the bottom of an object to a standard for identifying nonuniformities.

DISCLOSURE OF THE INVENTION

It is an object of the invention to provide a method and an apparatus for supporting and transporting objects horizontally with free access to their bottoms while maintaining precise, consistent centerline location.

It is a further object of the invention to provide a method and apparatus which eliminate friction between each of a pair of spaced transport belts and associated backing members which control the spacing between the belts.

It is another object of the invention to provide a method and apparatus for maintaining vertical orientation of a succession of containers while transporting them horizontally with access to the container bottoms.

It is a further object of the invention to provide a method and apparatus for maintaining vertical orientation of a succession of containers while transporting them horizontally past an inspection station requiring access to the bottoms of the containers.

It is a more specific object of a preferred embodiment of the invention to provide a method and apparatus which eliminate friction between each of a pair of spaced transport belts and associated backing members which control the spacing between the belts, and maintain precis, consistent centerline location a succession of containers while transporting them horizontally past an inspection station requiring access to the bottom of each container.

These and other objects are accomplished by the present invention which provides a method and apparatus for horizontally transporting objects in a predetermined vertical orientation.

The apparatus of the invention is capable of transporting a succession of objects, each having a vertical axis (i.e., centerline) and a width measured transversely to the vertical axis, along a horizontal transfer path while maintaining a constant vertical orientation of said objects along said horizontal path, and comprises: a pair of continuous transport belts having facing object-supporting surfaces and rear surfaces; support means contacting the rear surface of each of said transport belts for maintaining a substantially constant distance between the facing object-supporting surfaces throughout the length of said horizontal transport path; and means for moving the facing object-supporting surfaces of the transport belts in the direction of said horizontal transfer path.

The method of the invention comprises: providing a pair of continuous belts having facing object-supporting surfaces and rear surfaces, each of said belts being supported on its rear surface in a manner effective to maintain said belts substantially nonextensible along a horizontal transfer path; providing a supply of objects having a vertical axis and a width measured transversely to the vertical axis; adjusting the space between the belts to the width of the objects; moving the facing object-supporting surfaces of the belts in the same horizontal direction along said horizontal transfer path; positioning a succession of said objects between the facing object-supporting surfaces of said belts to thereby move said objects along said horizontal path and maintain a constant vertical orientation of said objects along said horizontal path.

BRIEF DESCRIPTION OF THE DRAWINGS

The invention will be better understood and its advantages will become more apparent from the following detailed description, especially when read in light of the accompanying drawings, wherein.

INDUSTRIAL APPLICABILITY

Figure 1:
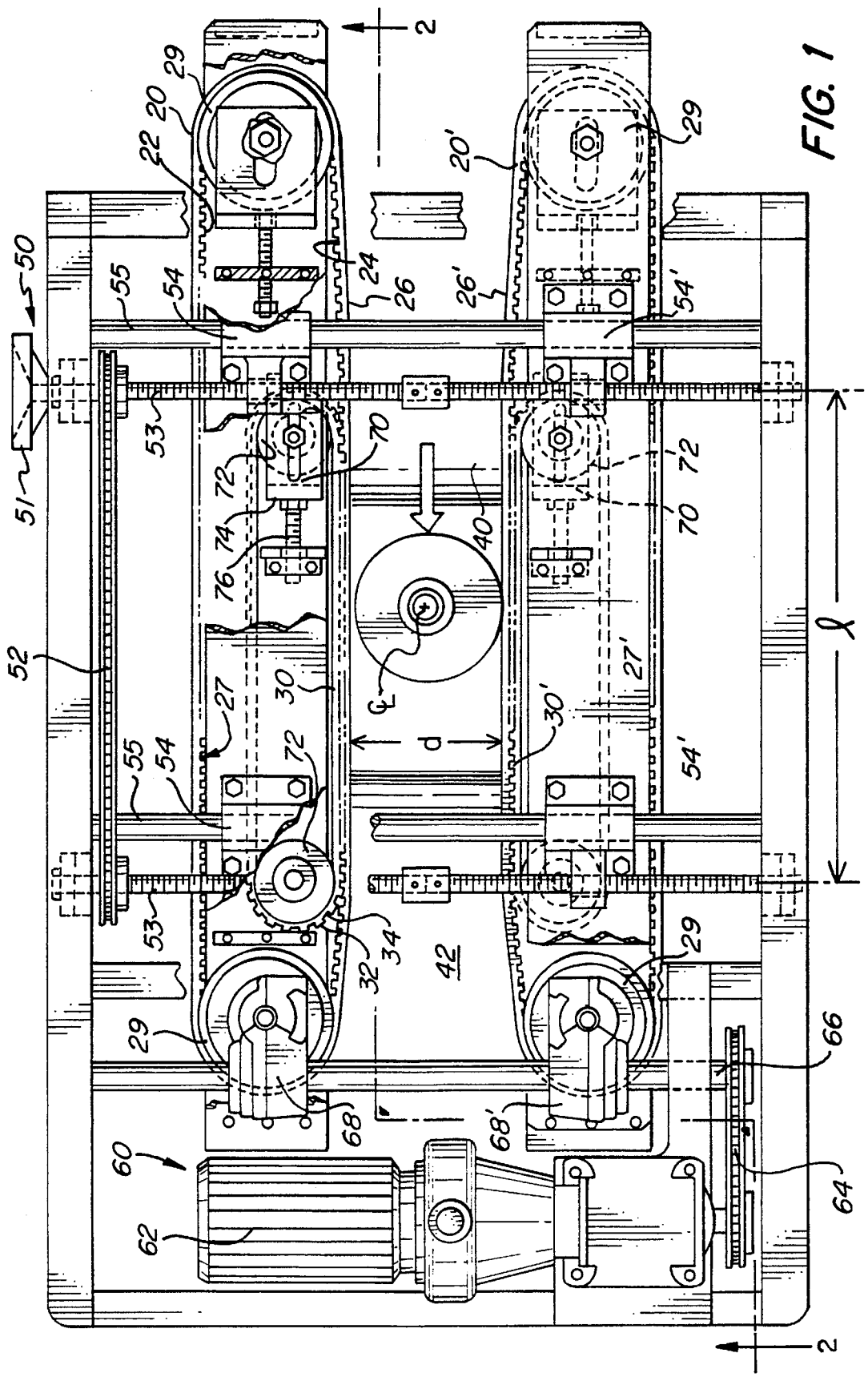
FIG. 1 is a top plan view of preferred form of apparatus of the invention.

The method and apparatus enable horizontally transporting a succession of objects of various construction and dimensions; however, the following description will explain in detail its application to glass bottles of the type illustrated in the Figures as bottle 10. It is necessary for these bottles to be transported horizontally, without bottom support, and yet at constant vertical orientation. In the case of glass bottles, this permits inspection at high speed by automated equipment. The uses for other objects will be varied and can include the high-speed encoding, such as by ink jet or other means.

Briefly, the Figures show a pair of continuous transport belts 20 and 20' which are supported to maintain a substantially constant distance d between the facing object-supporting surfaces. As will be explained in greater detail below, the transport belts 20 and 20' are preferably supported by a pair of complimentary interlocking belts 30 and 30'. The interlocking belts 30 and 30' are shown to comprise alternating teeth 32 and grooves 34 transverse to the horizontal transfer path, depicted as L in FIG. 1. The transport belts 20 and 20' have alternating teeth 22 and grooves 24 which mate with those on the support belts 30 and 30'. The transport belts 20 and 20', thus supported by belts 30 and 30', are rendered substantially inextensible transverse to the direction of the path L but can include a resilient surface 28 to adjust for minor dimensional variations of the bottles 10. Also, the friction between the two belts of a set (e.g., 20 and 30) is insufficient to cause wear which will lessen the consistent positioning achieved.

Figure 2:
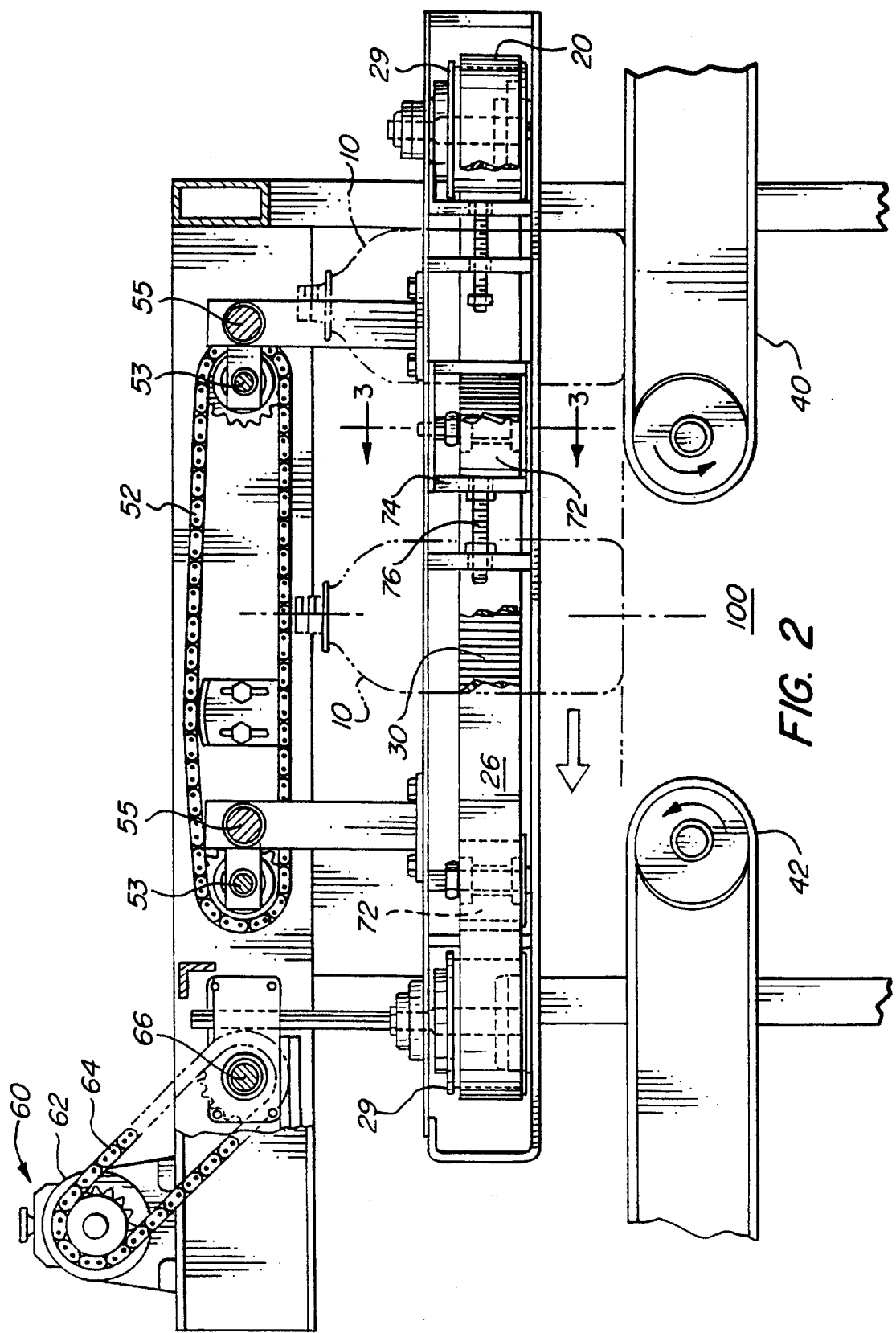
FIG. 2 is side elevational view of the apparatus shown in FIG. 1, shown in partial section taken along line 2—2 in FIG. 1.
Figure 3:
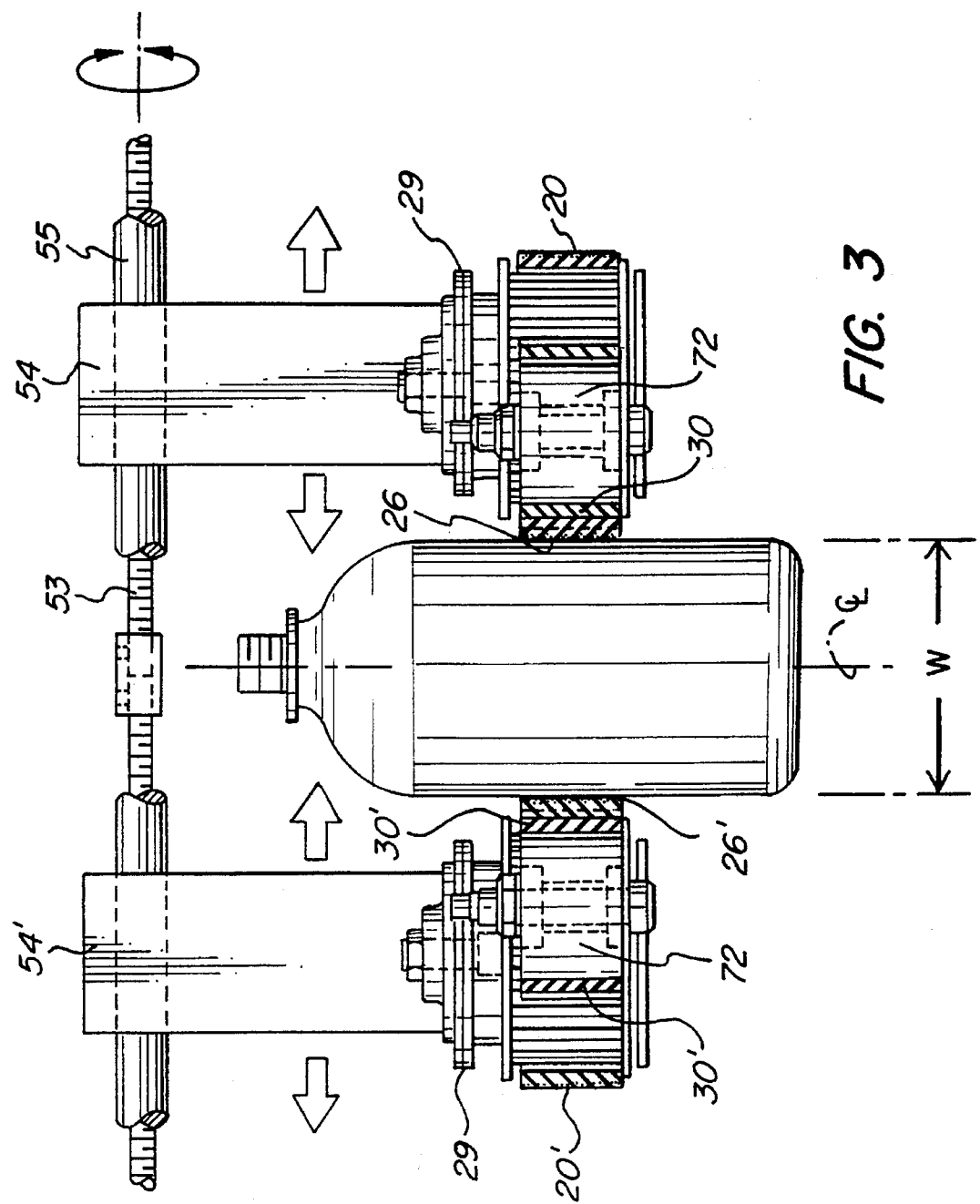
FIG. 3 is partial rear elevational view taken along line 3—3 in FIG. 2.
Figure 4:
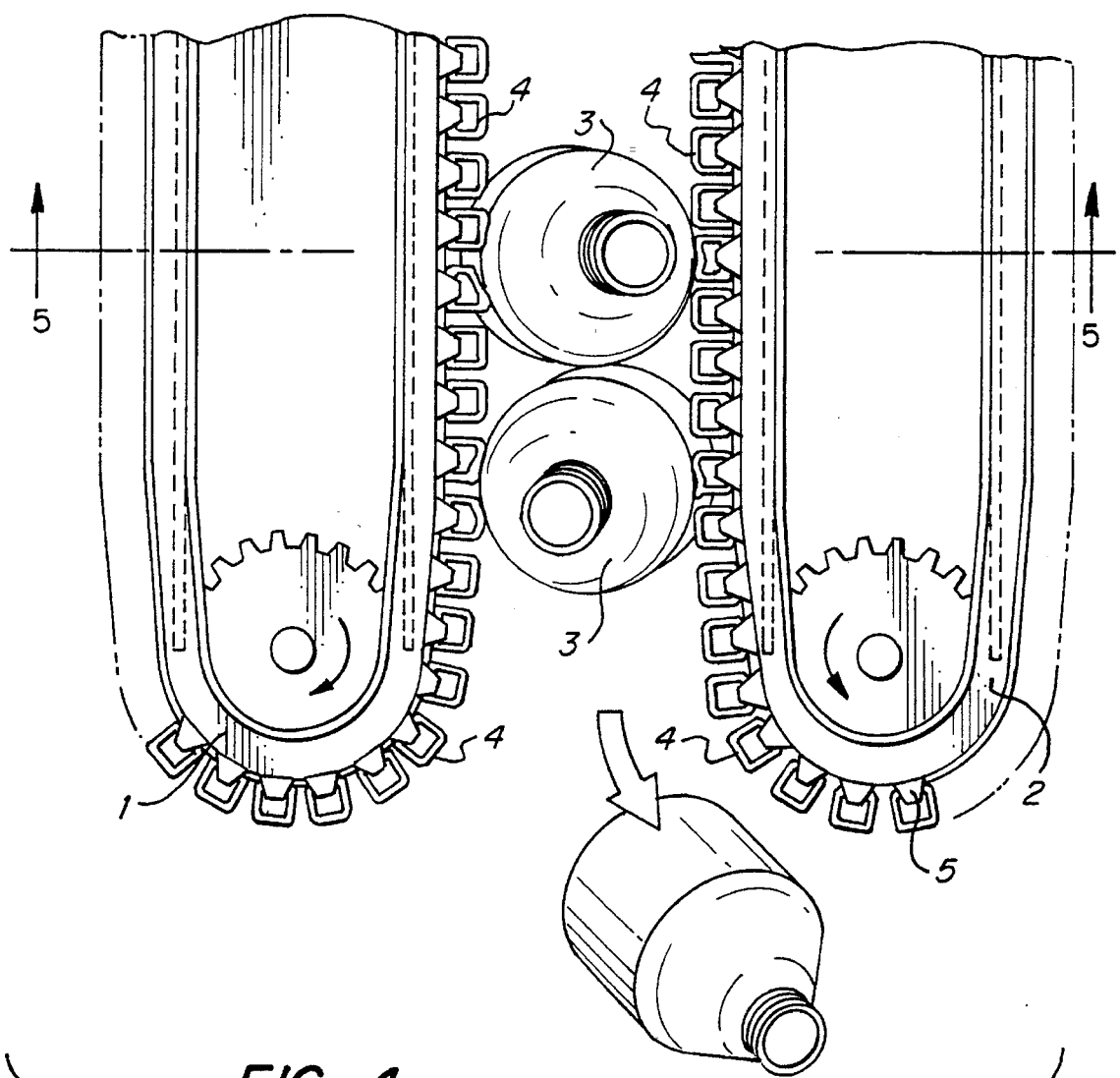
FIGS. 4 and 5 are denoted prior art and show the embodiment of the prior art described above.
Figure 5:
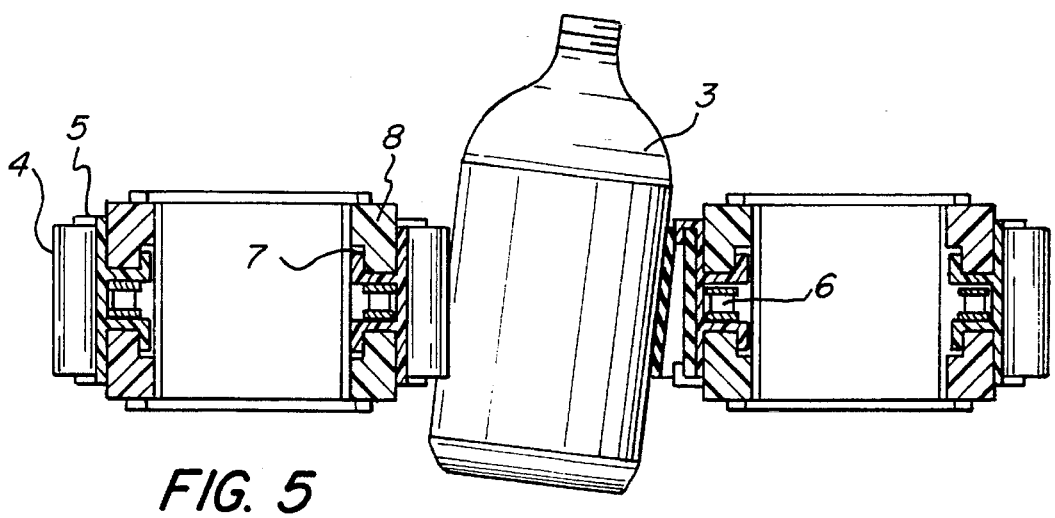

The Figures illustrate a succession of glass bottles 10, each having a vertical axis (i.e., centerline) $\mathcal{C}$ and a width w measured transversely to the vertical axis. The bottles 10 are transported from right to left in the drawing, as indicated by the arrows, along a horizontal transfer path L while maintaining a constant vertical orientation of the bottles along path L. FIG. 2 shows a feed conveyor 40 and a take-away conveyor 42. These conveyors are separated along the path of movement to free the bottoms of the bottles 10 for inspection at inspection station 100.

Each of the continuous transport belts 20 and 20' in the pair have facing object-supporting surfaces 26 and rear surfaces shown generally as 27. These belts are preferably made of rubber reinforced with cord. The object-supporting surfaces of these belts are shown to have a firm, low-slip surface layer 28. A minor degree of compressibility may be offered by this layer to adjust for minor variations in the dimensions of the bottles, however, this should not be done at the expense of consistent positioning.

Each of the transport belts 20 and 20' is extended between vertically-upstanding transport belt cylinders 29 positioned at opposite ends of each of the belts. Means 50 are provided for adjusting the space d between the transport belts to the width w of the containers. Means 50 are shown to be operated by crank wheel 51 which by means of a chain 52 moves threaded drives 53 which are threaded in opposite directions at their opposite ends. Rotation of the threaded drives 53 moves carriages 54 and 54' by virtue of threaded engagement therewith. Carriages 54 and 54' are maintained in alignment by guide members 55.

FIG. 1 illustrates means 60 for moving the facing object-supporting surfaces 26 and 26' of the transport belts in the same horizontal direction along the horizontal transfer path. The drive means 60 includes a motor 62 which drives a chain 64, which in turn drives drive shaft 66. Drive shaft 66 powers individual drive transmissions 68 and 68' for the belts 20 and 20', respectively.

Support belts 30 and 30' are positioned to contact the rear surfaces 27 and 27', respectively, of the transport belts 20 and 20' to render the transport belt substantially nonextensible transversely to the horizontal transfer path L. Means 70 and 70' are provided for adjusting the tension of support belts 30 and 30'. Means 70 is shown to comprise a pair of vertically-upstanding support belt cylinders 72 positioned at opposite ends of each support belt, a carriage 74 holding at least one of said support belt cylinders, and screw means 76 operable to move said carriage and the associated cylinder relative to the cylinder at the opposite end of said support belt.

Each of the support belts 30 and 30' has a regular pattern comprising alternating raised 32 and recessed 34 areas on the surface contacting the rear surface 27 of the complimentary transport belt. Timing belts are effective for this purpose. Each of these rear surfaces 27 and 27' of transport belts 20 and 20°, respectively, has a configuration which mates with the regular pattern the support belt in contact therewith. Preferably, the regular pattern on the support belt surfaces which contacts the rear surfaces 27 and 27' of the transport belts comprises alternating teeth 34 and grooves 32.

In operation, a supply of bottles 10 is provided and appropriately oriented such that their vertical axes are vertical. The space between the belts is adjusted to the width of the bottles. The facing object-supporting surfaces 26 and 26' of the belts 20 and 20' are advanced in the same horizontal direction along said horizontal transfer path. The bottles are conveyed to between the transport belts and positioned between the facing object-supporting surfaces of the belts to thereby move the bottles along the horizontal path and maintain a constant vertical orientation of the objects along said horizontal path. When the bottles reach inspection station 100, their bottoms are free and the centerlines are precisely, consistently located. While any inspection apparatus can be employed, the preferred ones use optical cameras which, with computerized defect detection apparatus, compare the bottom of an object to a standard for identifying nonuniformities The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

We claim:

1. An apparatus capable of transporting a succession of objects, each having a vertical axis and a width measured transversely to the vertical axis, along a horizontal transport path while maintaining a constant vertical orientation of said objects along said path, said apparatus comprising:

a pair of continuous transport belts having facing object-supporting surfaces and rear surfaces;

support means comprising a pair of support belts, a surface of each of which contacts one of said rear surfaces of said transport belts to render the transport belts substantially nonextensible transversely to said horizontal path of movement and maintain a substantially constant distance between the facing object-supporting surfaces throughout the length of said horizontal transport path; and means for moving the facing object-supporting surfaces of the transport belts in the direction of said horizontal transfer path.

2. An apparatus according to claim 1 wherein each support belt has a regular pattern comprising alternating raised and recessed areas on the surface contacting said rear surface of said transport belt, and each of said rear surfaces of said transport belts has a configuration which mates with said regular pattern the support belt in contact therewith.

3. An apparatus according to claim 2 wherein said regular pattern on the surface contacting said rear surface of said transport belt comprises alternating teeth and grooves transverse to the horizontal transfer path.

4. An apparatus according to claim 1 wherein means are provided to adjust the tension of each of the support belts.

5. An apparatus according to claim 4 wherein said means to adjust the tension of each of the support belts comprises a pair of vertically-upstanding cylinders positioned at opposite ends of said support belt, a carriage holding at least one of said cylinders, and screw means operable to move said carriage and the associated cylinder relative to the cylinder at the opposite end of said support belt.

6. An apparatus according to claim 1 wherein each of the transport belts is extended between vertically-upstanding transport belt cylinders positioned at opposite ends of the transport belts.

7. An apparatus according to claim 6 wherein centers of the vertically-upstanding transport belt cylinders for each transport belt define a line, and the lines defined for both transport belt are parallel.

8. An apparatus according to claim 7 which includes means to adjust the spacing between the lines defined for the transport belts.

9. An apparatus according to claim 1 wherein the object-supporting surfaces have a firm, low-slip surface layer.

10. An apparatus for transporting a succession of glass bottles, each having a vertical axis and a width measured transversely to the vertical axis, along a horizontal transfer path while maintaining a constant vertical orientation of said objects along said horizontal path, said apparatus comprising:

a pair of continuous transport belts having facing object-supporting surfaces and rear surfaces, each of the transport belts being extended between vertically-upstanding transport belt cylinders positioned at opposite ends;

means for adjusting the space between the transport belts to the width of the containers;

a pair of support belts, each positioned to contact the rear surface of one of said transport belts to render the transport belt substantially nonextensible transversely to said horizontal path;

means for adjusting the tension of each of the support belts; and means for moving the facing object-supporting surfaces of the transport belts in the same horizontal direction along the horizontal transfer path.

11. An apparatus according to claim 10 wherein each support belt has a regular pattern comprising alternating raised and recessed areas on the surface contacting said rear surface of said transport belt, and each of said rear surfaces of said transport belts has a configuration which mates with said regular pattern the support belt in contact therewith.

12. An apparatus according to claim 11 wherein said regular pattern on the surface contacting said rear surface of said transport belt comprises alternating teeth and grooves.

13. An apparatus according to claim 10 wherein said means to adjust the tension of each of the support belts comprises a pair of vertically-upstanding support belt cylinders positioned at opposite ends of said support belt, a carriage holding at least one of said support belt cylinders, and screw means operable to move said carriage and the associated cylinder relative to the cylinder at the opposite end of said support belt.

14. An apparatus according to claim 13 which includes an inspection station located at a position below said horizontal path of movement.

15. An apparatus according to claim 10 wherein the object-supporting surfaces have a firm, low-slip surface layer.

16. A method for transporting a succession of objects, each having a vertical axis and a width measured transversely to the vertical axis, along a horizontal transfer path while maintaining a constant vertical orientation of said objects along said horizontal path, said method comprising the steps of:

providing a pair of continuous belts having facing object-supporting surfaces and rear surfaces, each of said belts being supported on its rear surface by the surface of a support belt having a regular pattern comprising alternating raised and recessed areas on the surface contacting said rear surface of said transport belt, and each of said rear surfaces of said transport belts has a configuration which mates with said regular pattern the support belt in contact therewith, to thereby maintain said belts substantially nonextensible along a horizontal transfer path;

providing a supply of objects having a vertical axis and a width measured transversely to the vertical axis;

adjusting the space between the belts to the width of the objects;

moving the facing object-supporting surfaces of the belts in the same horizontal direction along said horizontal transfer path;

positioning a succession of said objects between the facing object-supporting surfaces of said belts to thereby move said objects along said horizontal path and maintain a constant vertical orientation of said objects along said horizontal path.

17. A method according to claim 16 wherein said regular pattern on the surface contacting said rear surface of said transport belt comprises alternating teeth and grooves transverse to the horizontal transfer path.

18. A method according to claim 16 wherein the object-supporting surfaces have a firm, low-slip surface layer.

\* \* \* \* \*